(12) United States Patent
Ohno et al.

(10) Patent No.: US 8,281,356 B2
(45) Date of Patent: Oct. 2, 2012

(54) TRANSMITTER

(75) Inventors: Michihiro Ohno, Tokyo (JP); Masafumi Takahashi, Sakura (JP); Katsuo Doi, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1522 days.

(21) Appl. No.: 11/666,613

(22) PCT Filed: Oct. 31, 2005

(86) PCT No.: PCT/JP2005/020005
§ 371 (c)(1),
(2), (4) Date: Apr. 30, 2007

(87) PCT Pub. No.: WO2006/054442
PCT Pub. Date: May 26, 2006

(65) Prior Publication Data
US 2008/0095247 A1 Apr. 24, 2008

(30) Foreign Application Priority Data
Nov. 17, 2004 (JP) .................................. 2004-333246

(51) Int. Cl.
*H04N 7/173* (2011.01)
(52) U.S. Cl. .......................... 725/116; 725/146; 370/235
(58) Field of Classification Search ............ 725/91–116, 725/124, 125; 709/217–231; 370/235, 252, 370/253, 468
See application file for complete search history.

(56) References Cited

U.S. PATENT DOCUMENTS

| | | | | |
|---|---|---|---|---|
| 5,812,790 A | * | 9/1998 | Randall | 709/247 |
| 5,859,979 A | * | 1/1999 | Tung et al. | 709/228 |
| 5,931,928 A | * | 8/1999 | Brennan et al. | 710/68 |
| 5,949,975 A | * | 9/1999 | Batty et al. | 709/213 |
| 6,233,226 B1 | * | 5/2001 | Gringeri et al. | 370/252 |
| 6,366,959 B1 | * | 4/2002 | Sidhu et al. | 709/231 |
| 6,487,603 B1 | * | 11/2002 | Schuster et al. | 709/231 |
| 6,909,753 B2 | * | 6/2005 | Meehan et al. | 375/240.27 |
| 7,099,954 B2 | * | 8/2006 | Li et al. | 709/233 |
| 2002/0053053 A1 | | 5/2002 | Nagai et al. | |
| 2002/0136164 A1 | | 9/2002 | Fukuda et al. | |
| 2003/0152032 A1 | | 8/2003 | Yanagihara et al. | |
| 2004/0199659 A1 | | 10/2004 | Ishikawa et al. | |

FOREIGN PATENT DOCUMENTS

| | | |
|---|---|---|
| EP | 1 058 459 A2 | 12/2000 |
| EP | 1 168 732 A1 | 1/2002 |
| EP | 1 202 487 A2 | 5/2002 |
| EP | 1 345 446 A1 | 9/2003 |
| EP | 1372304 A2 | 12/2003 |

(Continued)

*Primary Examiner* — Annan Shang
(74) *Attorney, Agent, or Firm* — Birch, Stewart, Kolasch & Birch, LLP

(57) ABSTRACT

A source device 10 transmits streaming data. In a packet receiver 22 of a sync device 20, statistical data acquirer 23 calculates statistical data such as one-way delay time, packet loss ratio, reception rate and the like from the received streaming data and transmits it to the source device. The statistical information received by source device 20 is extracted by a packet receiver 15 and input to a channel band estimator 16. The channel band estimator 16 gives encoder 11 instructions to provide optimal encoding based on the transmission delay. Upon this, the transmission delay is calculated by assuming the minimum value of the communication delay from the start of transmission as zero. Control is performed by determining the delay time and packet loss ratio in data transmission and considering, based on these, the channel quality and bandwidth margin, so as to provide the optimal transmission bit rate or encoding rate.

4 Claims, 10 Drawing Sheets

FOREIGN PATENT DOCUMENTS

| | | |
|---|---|---|
| EP | 1376952 A1 | 1/2004 |
| EP | 1 434 378 A2 | 6/2004 |
| EP | 1450514 A1 | 8/2004 |
| JP | 8-056237 A | 2/1996 |
| JP | 2000-350197 A | 12/2000 |
| JP | 2001-230809 A | 8/2001 |
| JP | 2002-204278 A | 7/2002 |
| JP | 2003-244695 A | 8/2003 |
| JP | 2003-318967 A | 11/2003 |
| JP | 2004-254258 A | 9/2004 |

* cited by examiner

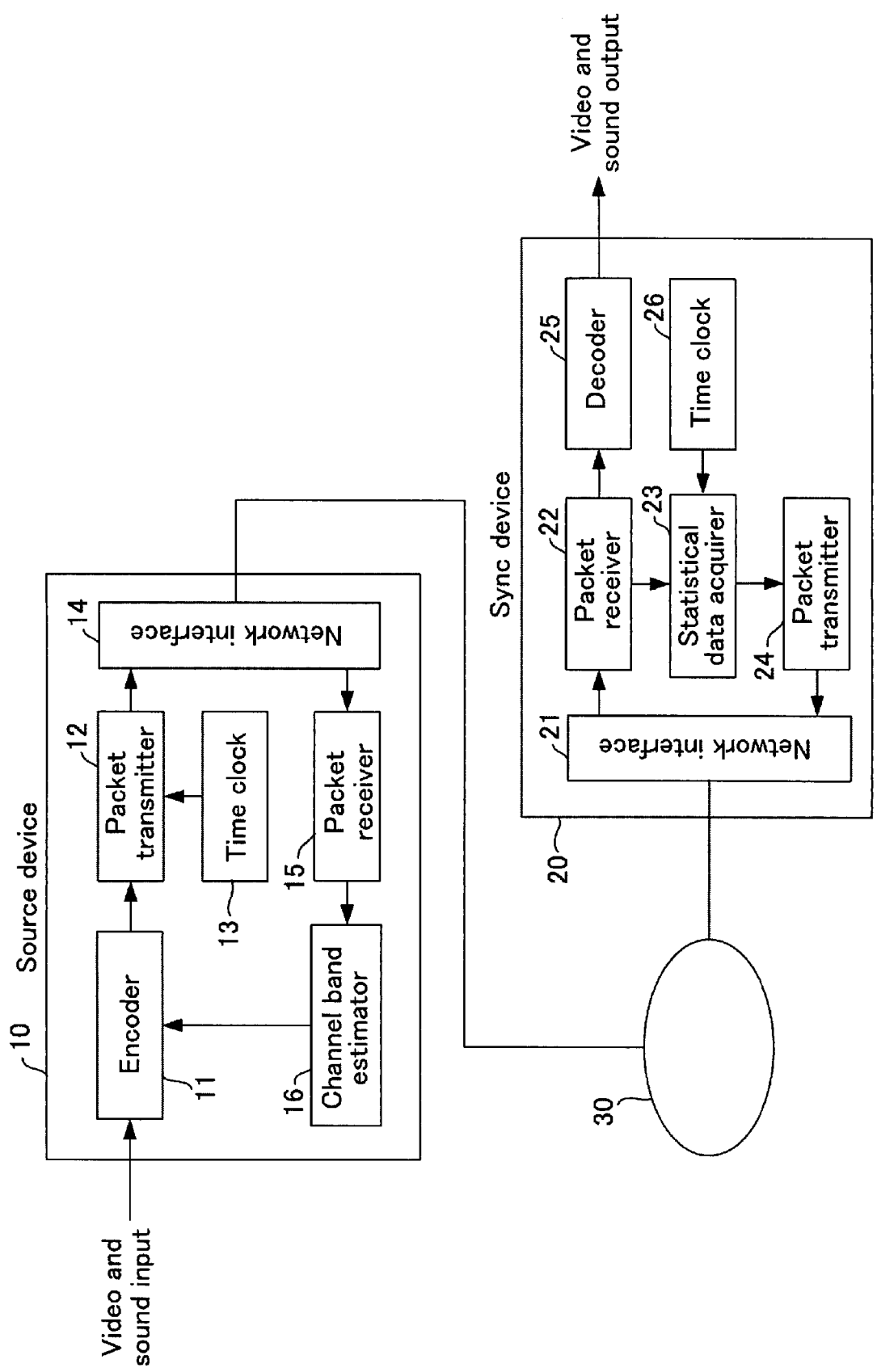

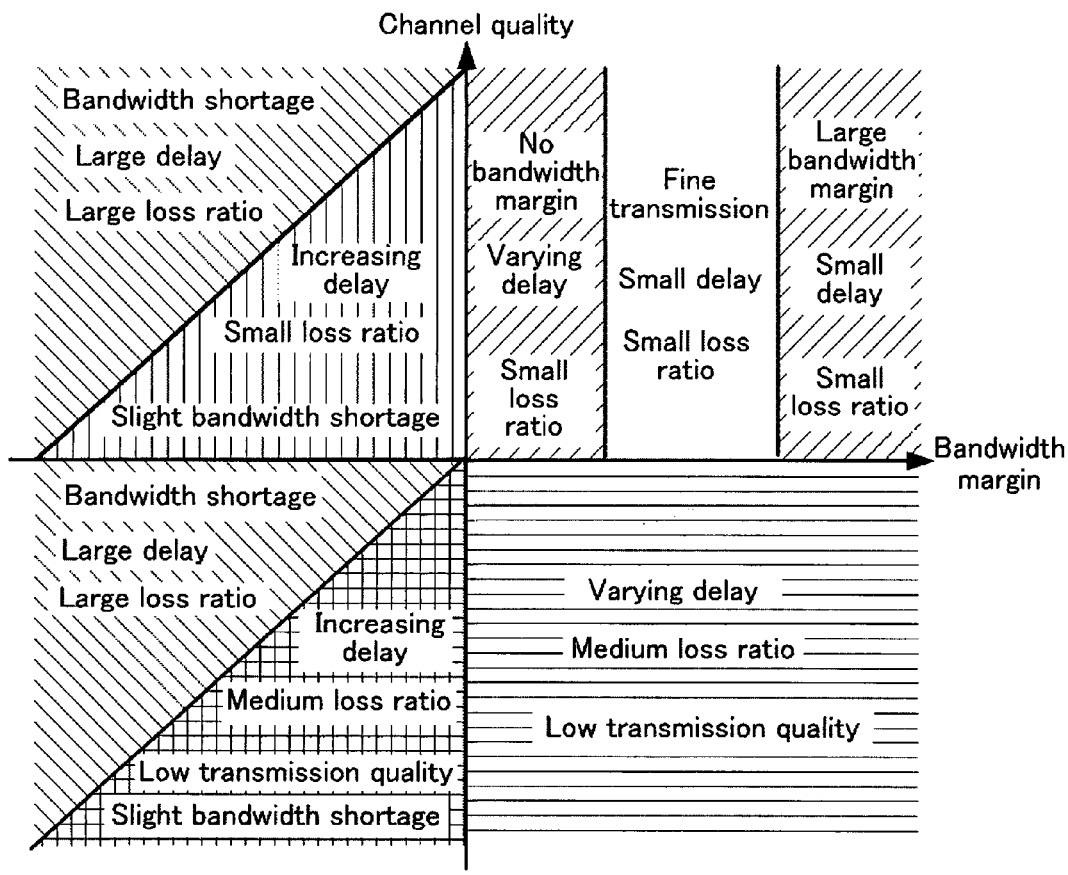

TRANSMITTER

TECHNICAL FIELD

The present invention relates to a transmitter which, upon transmission and reception of streaming data, determines the delay time and packet loss ratio in data transmission and makes control so that the optimal transmission bit rate or encoding rate can be given by taking into account the channel quality and bandwidth margin based on the determined delay time and packet loss ratio.

BACKGROUND ART

In networks such as the Internet and the like, there are cases in which delay of data transmission, loss of packets and jitters of transmission delay occur due to transmission band, channel quality and the like. For this reason, when streaming data obtained by compressing continuous media such as video and sound information is transmitted and reproduced in a continuous way, there occur cases where data transmission quality is corrupted so that it is difficult to reproduce it smoothly.

That is, a network can be considered to be a combination of a queue of a limited length and a channel. If an amount of data equal to or greater than the bandwidth of the channel is attempted to flow, the data is accumulated in the queue, and the delay taken for transmission increases. A further continuation of flowing data equal to or greater than the bandwidth overflows the queue and packets are lost. Also, in use of a channel low in transmission quality there occur cases that packets are lost without regards to the amount of data, the order of packets is changed, and transmission delay fluctuates.

To deal with, for example, as disclosed in Patent document 1 referred to later, the encoding rate is controlled in order to perform efficient data transmission by suppressing quality degradation on the data receiving side.

FIG. 11 is a block diagram showing a conventional communication system. For convenience of illustration, the system is divided into parts (a) and (b) at point A. The transmission side includes a camera 101, a real-time encoder 102 and a transmission controller 103 while the reception side includes a reception controller 111, a real-time decoder 112, a reproducing display 113. The transmission side and the reception side are connected by a network 105.

On the transmission side in (a) of the same figure, video information input from camera 101 is real-time encoded by real-time encoder 102 at a transmission bit rate designated by transmission controller 103. The transmission bit rate in real-time encoder 102 is designated by bit rate feedback information from transmission controller 103.

In this data format for transmission, in order to enable the order and reproduction timing of transmitted packets to be recognized on the reception side, a serial number is allotted to every packet and time stamps representing the reproduction timing of the data included in each packet are also added. As a format for this purpose, RTP (Real-time Transport Protocol) has been widely used. Also, in order to control the transmission based on RTP, RTCP (RTP Control Protocol) has been widely used. Though the present invention as well as the prior art is not limited to RTP/RTCP, for simplicity the following description will be made referring to a system that is presumed based on RTP/RTCP which can be widely understood.

Video data packets transmitted through network 105 are received by reception controller 111 on the reception side in (b) in the figure. In reception controller 111, based on the serial numbers attached to the received video data packets, irregular reception status of video data packets such as loss of video data packets, change in the order of arrival, repeated reception and the like is detected. From the video data packets which are determined to have arrived in time for reproduction, video data stored in their payloads is picked up. Video data packets which are determined to be late for their reproduction timing are discarded. The video data is transferred together with time stamps to real-time decoder 112, where it is decoded in real time and reproduced and displayed on reproducing display 113 in accordance with the time stamps.

Other than video data packets, transmission controller 103 also sends out SR (Sender Report) packets (to be called SR packets, hereinbelow) for carrying control information in order to enable measurement of quality parameters of the network to determine the status of congestion. The SR packet is sent out periodically from transmission controller 103 to reception controller 111 on the reception side in FIG. 1(b). The format of a SR packet includes time information (transmission time stamp) on the time when it was transmitted.

On the other hand, when receiving a SR packet, reception controller 111 sends out a RR (Receiver Report) packet (to be called RR packet hereinbelow) for carrying control information to transmission controller 103. The format of the RR packet includes the transmission time stamp information included in the received SR packet and information on the lapse time from when the reception side received the SR packet until the RR packet is transmitted.

In transmission controller 103 that has received the RR packet, it is possible to determine the outgoing and returning transmission delay (Round Trip Time) of the control packets (SR packet and RR packet) by the following equation (1)

$$Trnd = (Trcv - Tsnd) - Tstay \qquad (1)$$

where

Trnd: round trip time of control signal packets;
Trcv: time at which the transmission controller received a RR packet;
Tsnd: time at which the SR packet that corresponds to the RR packet received by the transmission controller was sent out (transmission time stamp information stored in the RR packet); and
Tstay: time from when the reception controller received a SR packet until it sends out the RR packet (lapse time information stored in the RR packet).

The format of the RR packet also stores network congestion information such as the packet loss ratio relating to video data packets received by reception controller 111 and jitter information representing fluctuation of transmission delay.
Patent Document 1:
Japanese Patent Application Laid-open 2003-244695.

DISCLOSURE OF INVENTION

Problems to be Solved by the Invention

Since the round trip time (which will be referred to as RTT hereinbelow) used for transmission rate control in the above prior art is not affected by the deviation between the time clocks of individual transmitting and receiving apparatuses, it can be easily calculated. However, RTT is affected not only by the transmission delay from the transmitter to the receiver but also by the transmission delay from the receiver to the transmitter. Here, the delay of the reverse direction from the receiver to the transmitter is irrelevant to the transmission rate of streaming data sent out from the transmitter. That is, the fact that transmission rate control is affected by this factor is a hindrance to achievement of exact transmission rate control.

Adverse influence of this kind becomes conspicuous with ADSL (Asymmetric Digital Subscriber Line) whose band is asymmetric.

Further, as shown in FIG. 12, as transmission rate is gradually increased, the delay time remains constant in the beginning while the reception rate increases consistently with the transmission rate. When the transmission rate reaches the channel bandwidth, the reception rate is saturated and increase in transmission delay due to accumulation of data in the queue in the network is observed. A further continuation of the condition in which the transmission rate exceeds the channel bandwidth causes packet loss, hence part of the transmitted data is lost. In this condition, even if the transmission rate is enhanced the transmitted data is merely discarded, so the quality of the reproduced video and sound is not improved at all but is degraded due to loss of data. To deal with this, the aforementioned conventional technique is adapted to reduce the transmission rate if just the packet loss ratio increases. However, packet loss could occur due to other causes than the excessive transmission rate in the transmitter. In that case, if the transmission rate is decreased, this only results in mere degradation of the quality of the transmitted video and sound without achieving any reduction in packet loss ratio.

In view of the circumstances described above, the present invention is to provide a transmitter which determines the delay time and packet loss ratio in data transmission and makes control so that the optimal transmission bit rate or encoding rate can be given by taking into account the channel quality and bandwidth margin based on the determined delay time and packet loss ratio.

Means for Solving the Problems

A transmitter of the present invention is a transmitter which transmits streaming data and controls a transmission bit rate or an encoding rate based on a transmission delay of the streaming data and a packet loss ratio of the streaming data both of which are determined by reception of the streaming data by a receiver, and is characterized in that the transmission delay used for control is a varying value on the basis of, at least, a delay at a start of communication and when the packet loss ratio has increased without increase of the transmission delay, the encoding rate is kept unchanged.

A transmitter of the present invention is a transmitter which transmits streaming data and controls a transmission bit rate or an encoding rate based on a transmission delay of the streaming data and a packet loss ratio of the streaming data both of which are determined by reception of the streaming data by a receiver, and is characterized in that the transmission delay used for control is a varying value on the basis of a minimum value of the communication delay from a start of communication and when the packet loss ratio has increased without increase of the transmission delay, the encoding rate is kept unchanged.

Effect of the Invention

According to the present invention, based on the streaming data sent from the transmitter, the receiver determines the transmission delay and the packet loss ratio. The transmission side, based on the determined values, controls the transmission bit rate or the encoding rate. Accordingly, it is possible to perform data transmission and reception with disturbance of data minimized even in an unstable network such as an IP network. Particularly, since the transmission delay and packet loss ratio in the one-way direction from the transmitter to the receiver are determined, this scheme is not affected by the delay in the unnecessary direction unlike the scheme using RTT.

BRIEF DESCRIBED OF THE DRAWINGS

FIG. 1 is a block diagram showing one embodiment of a communication system of the present invention.

FIG. 2 is an illustrative chart showing network conditions indicated taking channel quality and bandwidth margin as the axes.

FIG. 3 is a table showing control contents for the source side device and sync side device.

DESCRIPTION OF REFERENCE NUMERALS

Figure 4:
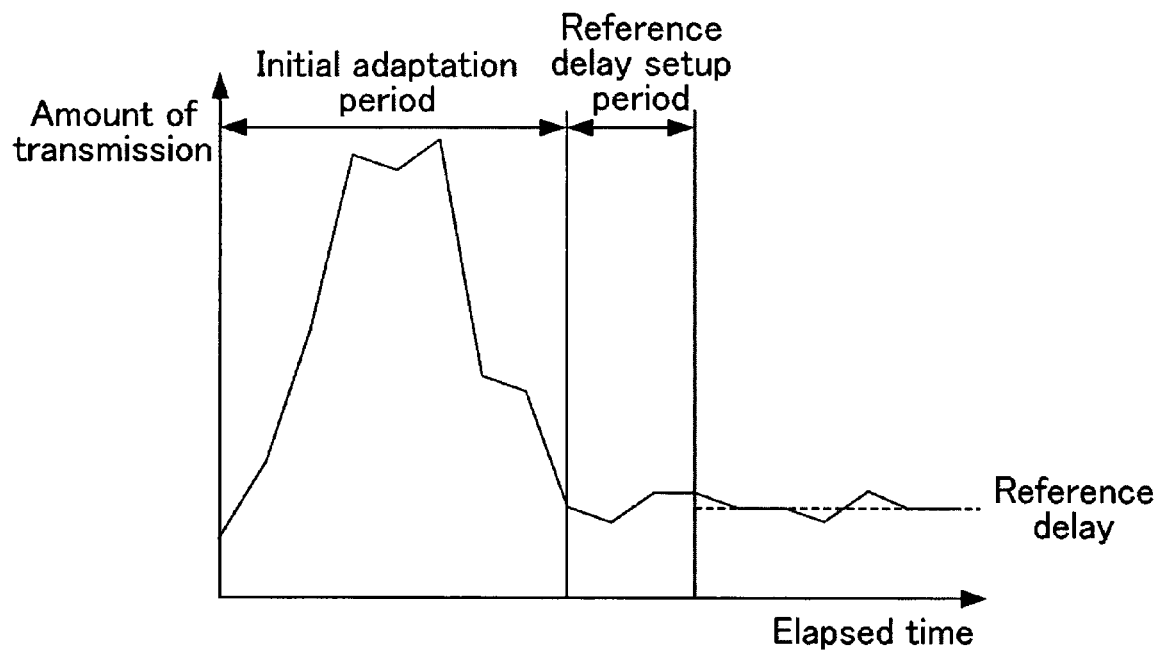
FIG. 4 is an illustrative chart for provision of a reference delay setup period after an initial adaptation period.

10 source device
11 encoder
12 packet transmitter
13 time clock
14 network interface
15 packet receiver
16 channel band estimator
20 sync device
20 source device
21 network interface
22 packet receiver
23 statistical data acquirer
24 packet transmitter
25 decoder
26 time clock
30 network

BEST MODE FOR CARRYING OUT THE INVENTION

Next, the embodiment of the present invention will be described with reference to the accompanying drawings.

FIG. 1 is a block diagram showing one embodiment of a communication system of the present invention. This communication system is comprised of a source device 10 on the transmission side, a network 30 such as the Internet or the like and a sync device 20 on the reception side. The connection between source device 10 and sync device 20 is mentioned as network 30, but this can be constituted by a simple line.

Source device 10 is comprised of an encoder 11, a packet transmitter 12, a time clock 13, a network interface 14, a packet receiver 15 and a channel band estimator 16. On the other hand, sync device 20 is comprised of a network interface 21, a packet receiver 22, a statistical data acquirer 23, a packet transmitter 24, a decoder 25 and a time clock 26.

A transmission/reception apparatus of this communication system is composed of source device 10 and sync device 20 in pairs, and exchanges data with each other.

Video and sound input to source device 10 is encoded in, for example MPEG-4 by encoder 11 and divided into RTP packets by packet transmitter 12, then is sent out to network 30 via network interface 14. In this process, each packet is given a time stamp of the time measured by time clock 13.

In sync device 20, packet receiver 22 assembles the RTP packets received via network interface 21 into an MPEG4 stream, which is then decoded by decoder 25 to output video and sound. Packet receiver 22 also extracts information such as the serial number, packet size and time stamp of each packet, based on which statistical data acquirer 23 calculates statistical data such as one-way delay time, packet loss ratio, reception rate and the like. Packet transmitter 24 transmits the statistical data by means of an extended RTCP packet for transmitting one-way delay, from sync device 20 to source device 10 via network interface 21.

The statistical information received by source device 20 via network interface 14 is extracted by packet receiver 15 and input to channel band estimator 16. The channel band estimator 16 gives encoder 11 instructions to provide optimal encoding.

Next, the outline of controls to be made on the source side and sync side in respective areas will be shown.

As described in the section "problems to be solved by the invention", generally, as the transmission rate is gradually increased, the delay time initially remains constant while the reception rate increases consistently with the transmission rate. When the transmission rate reaches the channel bandwidth, the reception rate is saturated and increase in transmission delay due to accumulation of data in the queue in the network is observed. A further continuation of the condition in which the transmission rate exceeds the channel bandwidth causes packet loss, hence part of the transmitted data is lost. The delay time is saturated under this condition.

Here, the network conditions are put in order with the channel quality and bandwidth margin (=channel bandwidth−transmission rate) taken as the axes, as shown in FIG. 2. The channel quality and bandwidth margin are taken as the vertical and horizontal axes, respectively.

To being with, the first quadrant is an area free from problems, in which the packet loss ratio is low because the channel quality is high and the change in delay accompanied by the fine fluctuation of the transmission rate becomes small because the bandwidth margin becomes greater as it goes to the right. In this zone, there is no need to control the transmission bit rate and the encoding rate.

The second and third quadrants are areas in which there is a shortage of bandwidth. Since transmission delay is increasing or constant, each area is sectioned by a diagonal line for convenience' sake. In the part over the diagonal line there is a shortage of bandwidth hence causing large delay and resulting in a large packet loss ratio. On the other hand, in the part under the diagonal line, the delay is increasing and there is some shortage of bandwidth. Here in the second quadrant, since the channel quality is good the packet loss ratio is low in the area under the diagonal line. In the third quadrant the packet loss ratio in the area under the diagonal line is at the medium level because the channel quality is not good. In these areas, in order to eliminate shortage of bandwidth, the transmission bit rate and encoding rate are controlled based on the transmission delay and packet loss ratio, in order to reduce lost data as much as possible. The present invention is directed to the control in these second and third quadrants.

The fourth quadrant is an area in which there is enough bandwidth but the channel quality is low. Change in delay occurs and the packet ratio is at the medium level. However, these are attributed to channel quality, so there is no chance of improvement in transmission quality by the control in the source device, hence there is no need to make control.

FIG. 3 is a table showing control contents in the source device and the sync device. For each item, the control contents in the source device and the sync device are described.

When the transmission status is satisfactory, both the source device and the sync device keep the status quo. When there is a large bandwidth margin, the source device increases its transmission efficiency by increasing the encoding rate while the synch device keeps the status quo. When there is no bandwidth margin, both the source device and the sync device keep the status quo or decrease the encoding rate in some degree. When the transmission quality is low, the source device keeps the status quo while the sync device is caused to perform error correction. When there is shortage of bandwidth, the source device changes its encoding rate to the reception rate while the sync device performs error concealment, i.e., a process for concealing errors. An example is a process of discarding a broken frame in a motion picture and replacing it with a still image. When there is a slight shortage of bandwidth, the source device reduces encoding rate while the sync device discards delayed packets.

For individual items, the above-described controls can be considered. Next, a specific control that considers the transmission quality and bandwidth margin will be described.

To perform the above control, it is necessary to determine the delay time first. The delay time can be determined by subtracting the time stamp given at source device 10 from the reception time at sync device 20. However, it is difficult to exactly synchronize time clock 13 at source device 10 with time clock 26 at sync device 20. To deal with this, sync device 20 estimates an ordinary delay time of network 30 as a reference delay time and corrects the determined delay time, assuming the reference delay time to be zero. That is, Delay time=Packet reception time−Transmission time stamp−Reference delay time . . . (2)

Since no delay time and packet loss ratio have been determined in the period for initial adaptation immediately after start of communication there is a possibility that an excessive amount of transmission is performed as shown in FIG. 4. Therefore, the delay time during this period should be disregarded. After the communication has been stabilized, a reference delay setup period is given so as to measure delay time during this period, calculate the mean delay time and set it as the reference delay time.

However, in a network such as the Internet etc., there is a possibility that the data transmission route changes, this may cause abrupt change of delay time due to change of channel quality, bandwidth margin and the like. Therefore, if the delay time that was corrected based on the reference delay time greatly deviates in the negative direction during communication, the reference delay time as the mean value is revised. Detailedly, when the delay time determined by Equation (2) falls lower than a predetermined reference value (e.g., −200 msec), delay time is measured again by the duration of the reference delay setup period and its mean value is set to be the reference delay time.

Figure 5:
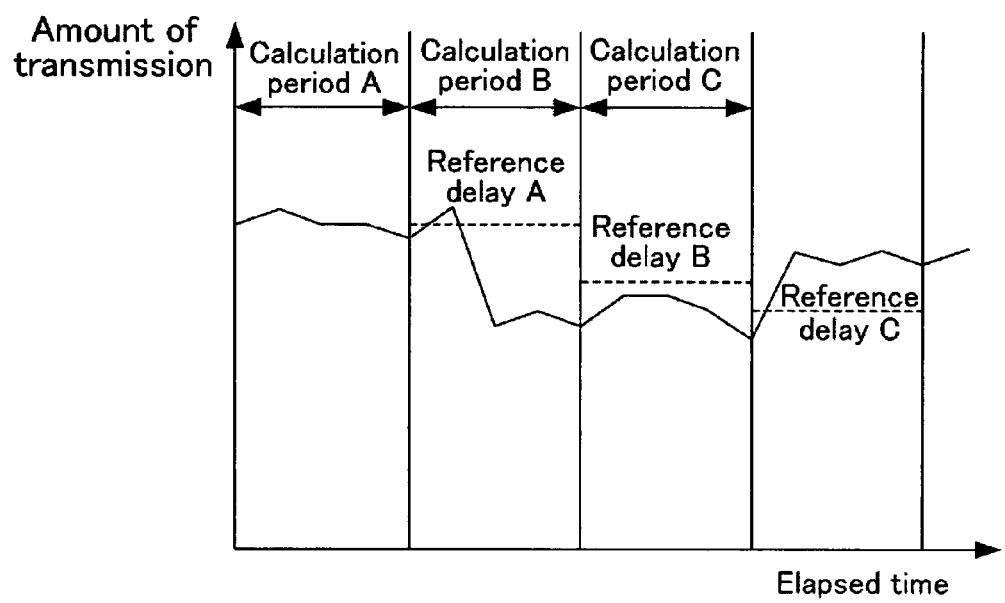
FIG. 5 is an illustrative chart for setting a reference delay time by determining the mean value of the delay time every predetermined period for calculation.

Alternatively, there is another method whereby the reference delay time is set by calculating the mean value of delay time for every predetermined estimation period, as shown in FIG. 5. In each estimation period, delay time is determined based on the reference delay time that was determined during the previous estimation period. In this way the reference delay time is periodically revised so as to avoid significant error arising in the delay time to be determined.

Figure 13:
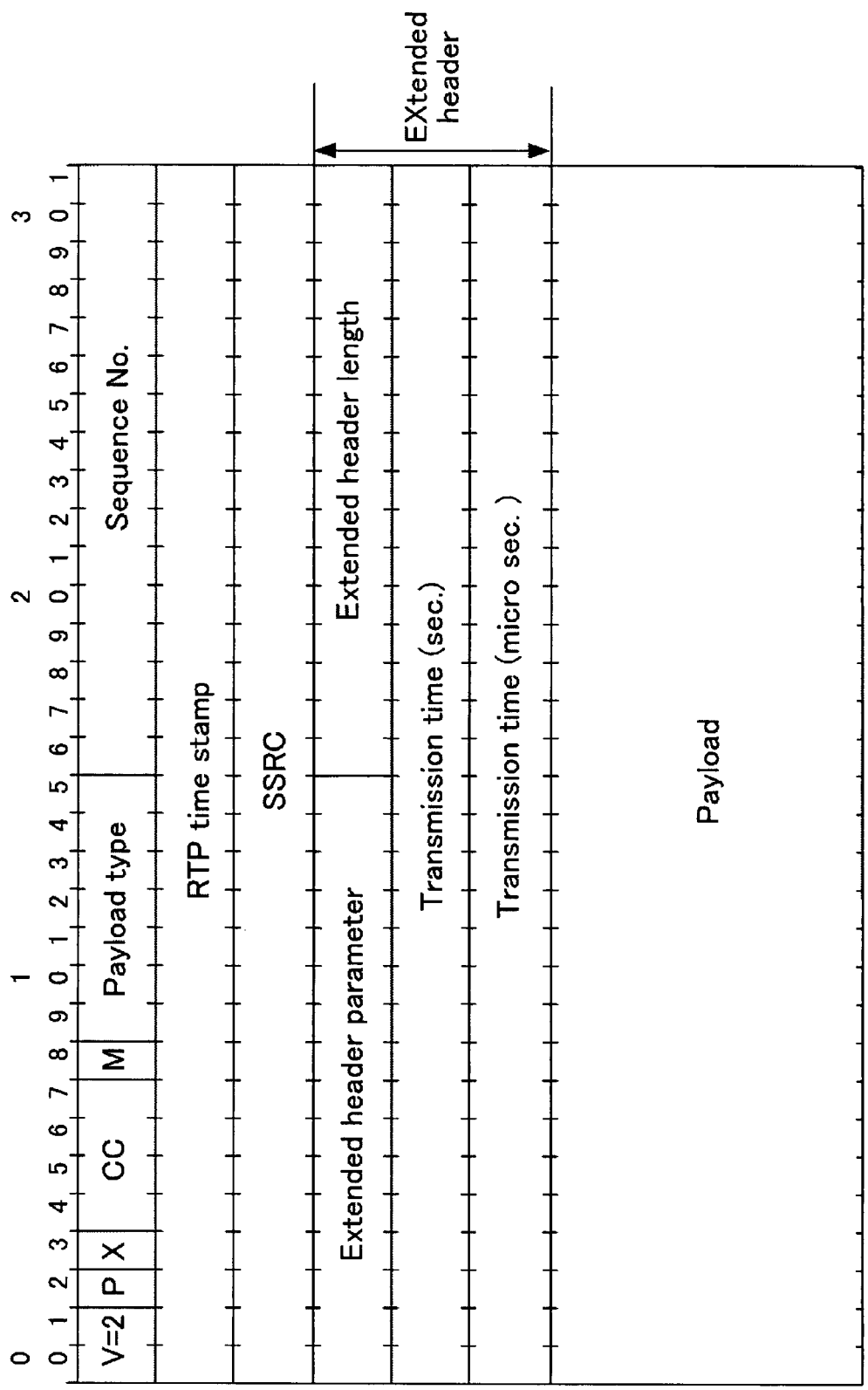
FIG. 13 is an illustrative diagram showing a RTP packet configuration where transmission time stamps are inserted in an extended header portion.

Concerning the measuring method of one-way delay, other than the method utilizing RTCP, it is also possible to measure the delay every packet by inserting transmission time stamps into an extended header portion of RTP packet. The RTP packet format including the transmission time stamps may be one that is shown in FIG. 13, for example.

It is impossible to make the transmission interval between RTCPs very short. In contrast, in the method of inserting the transmission time stamps to the RTP packet, it is possible to exactly grasp the congestion status in a quicker manner by determining the varying tendency based on the mean value or the maximum value of one-way delay, at intervals of 10 packets, for example.

As another method of determining the reference delay time, it is also possible to use the minimum value of the delay times up to that time. Not limited to the method of regarding the minimum value of the delay times of all the packets from the start of communication, as the delay time, there is a method of determining the minimum value in the range from a certain period before to the present, or a method of revising the minimum value as overlapping in the same manner as in FIG. 5.

Now, based on the delay time determined in the above manner, encoder 11 of source device 10 determines its encoding rate for the channel bandwidth, taking into account the fluctuation of the encoder output and margin band for other traffic.

When the channel bandwidth temporarily lowers, this temporal reduction is detected from the packet loss ratio, one-way transmission delay and the like, and a control of reducing the encoding rate is carried out. When increase in delay is observed, a control of reducing the encoding rate in a small degree is carried out. The detail is as follows.

(1) When transmission delay increases, the transmission rate is reduced by a necessary amount for canceling the delay.
(2) The threshold based on which transmission delay is determined as having increased is set at 400 msec, i.e., two times of the delay in the ordinary condition, where the delay in the ordinary condition is assumed to be 200 msec or lower.
(3) The transmission rate is reduced by 10% from the result of the measurement on the delay/transmission rate. If no decrease of the transmission delay is observed three seconds after the transmission rate was reduced, the transmission rate is reduced once again by 10%.

Figure 6:
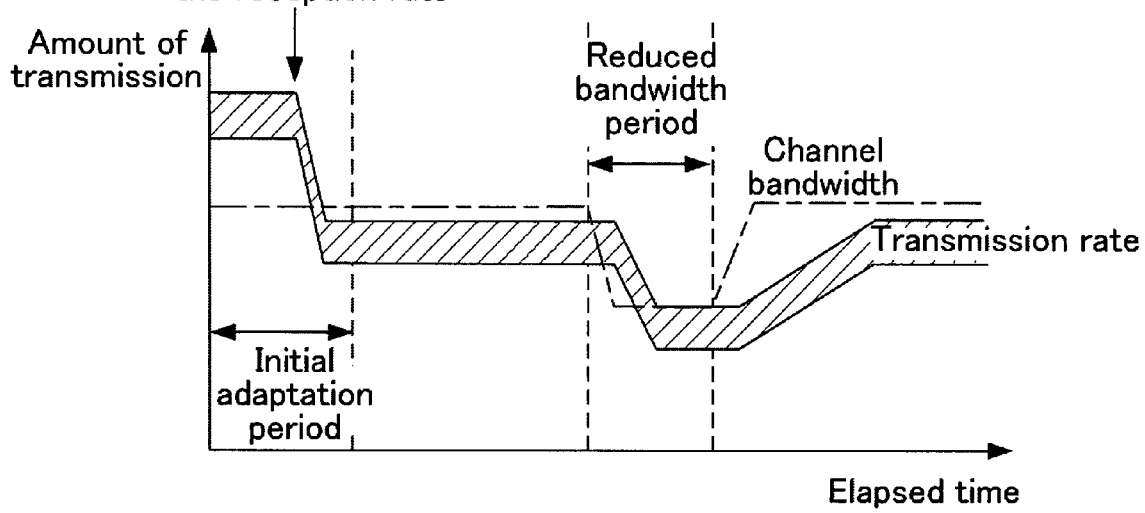
FIG. 6 is an illustrative chart showing how the encoding rate is changed in accordance with the variation in channel bandwidth.

If it is considered that packet loss is occurring due to a transmission rate far exceeding above the channel bandwidth, the encoding rate is determined based on the reception rate. This condition should not include the conditions where packet loss is occurring due to low channel quality. For example, as shown in FIG. 6, since encoder 11 at source device 10 has no information on channel quality, bandwidth margin and the like in the initial adaptation period the transmission rate is set at a value far exceeding the channel bandwidth, then the encoding rate is set up by estimating the reception rate based on the delay time and packet loss ratio sent from sync device 20. Since no packet loss will occur if the transmission rate does not far exceed the channel bandwidth, the condition of "far exceeding" is distinguished by the occurrence of packet loss exceeding by a certain amount or greater, for example, 1% or greater, due to an excess of the transmission rate over the bandwidth. Here, it is assumed that the maximum of the packet loss ratio that could occur due to lowness of channel quality is 1%.

Since in most encoders there is a time lag from the change in encoding rate until it is put into effect for the output rate, if a further control is made based on the statistical data obtained during this period there is a risk of divergence of control occurring. To avoid this, a certain period of time after the encoding rate has been changed is taken as a dead time during which no change in encoding rate is made. The dead time is a fixed value basically depending on the encoder; for example, it can be set at 3 seconds. Here, the reason for setting it at 3 seconds is that several steps are needed for revision of the encoding rate, including: the steps of setting an encoding rate (a time lag of 1 second until its operation), → transmission→revision of statistical information on the sync side (at intervals of 1 second), →transmission of statistical information (1 second margin), to finally return to the source side.

Figure 7:
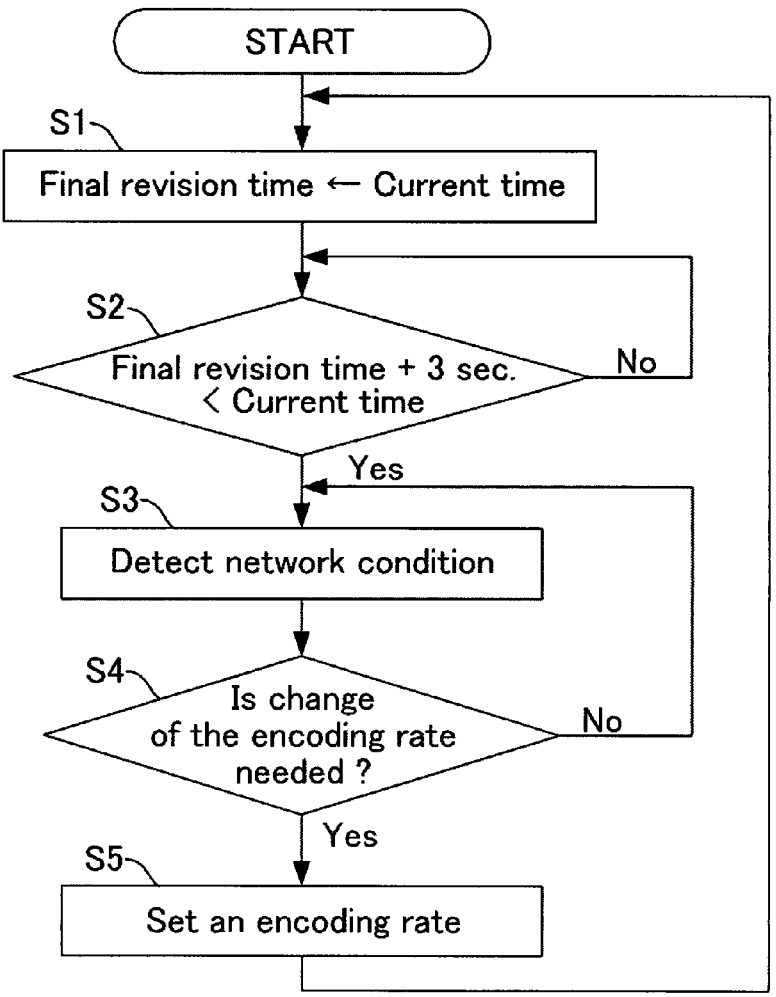
FIG. 7 is a flow chart showing a sequence of encoder setup with provision of a dead time.

FIG. 7 is a flowchart showing a sequence for encoder setup with provision of a dead time.

From the measurement of time on time clock 13 of source device 10, encoder 11 sets the current time to the final revision time of the encoding rate (Step S1). Then, it is checked whether the current time has passed 3 sec. from the final revision time (Step S2). When 3 seconds elapsed, statistical data is input from sync device 20 to channel band estimator 16 of source device 10, and channel band estimator 16 detects the network condition based on this data (Step S3) so as to determine whether revision of the encoding rate is needed (Step S4). If revision of the encoding rate is needed, a encoding rate is set in encoder 11 (Step S5), and the operation returns to Step S1 again. If no revision is needed, the operation returns to Step S3 and the network condition is detected.

In this way, the encoding rate is not set in encoder 11 during the response period even when channel band estimator 16 revises the encoding rate, so it is possible to eliminate the control divergence problem and the like.

Figure 8:
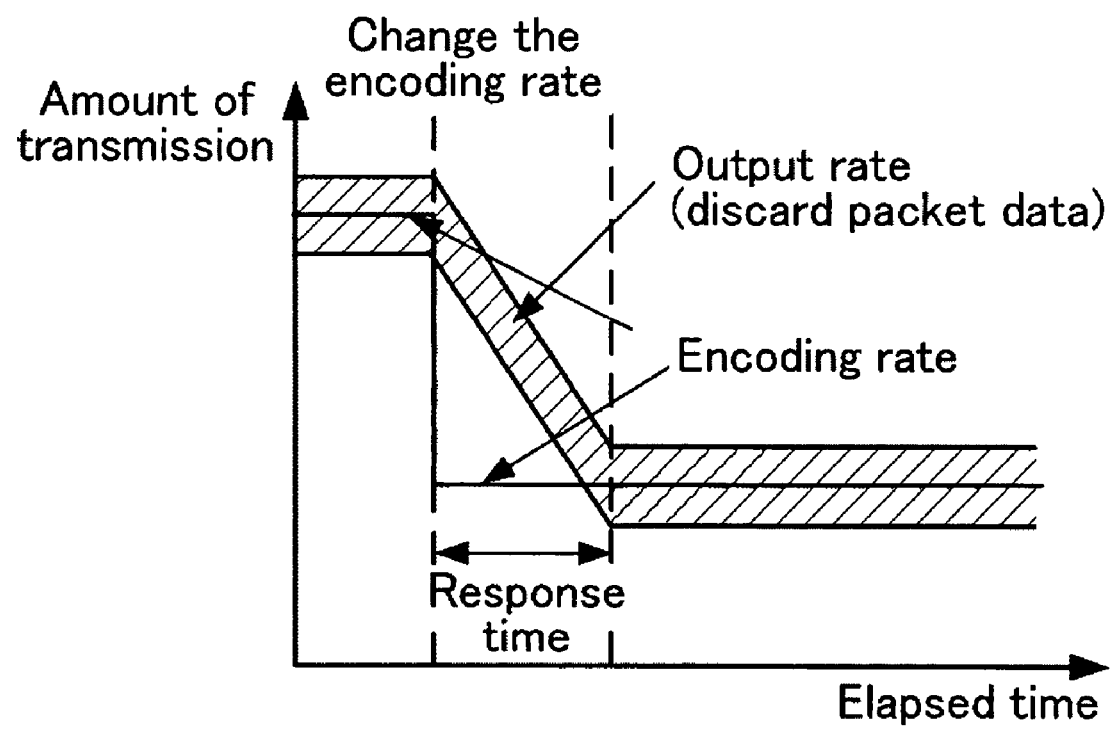
FIG. 8 is an illustrative chart showing how encoding data in excess of the encoding rate is discarded within the response time immediately after a change of the encoding rate.

However, since the presence of a dead time degrades control response as shown in FIG. 8, before the packets is sent out to the network, it is also an effective manipulation in packet transmitter 12 of source device 10 that to discard encoding data exceeding the encoding rate immediately after the change of the encoding rate. The data to be discarded is preferably selected as those being unlikely to affect decoding. That is, since if encoder 11 changes its encoding rate the encoding rate is not changed during its response time, if the data exceeding the encoding rate is adapted to be discarded, there is no need to provide a dead time.

Here, the "data being unlikely to affect decoding" means data, if it is mentioned in terms of MPEG, corresponding to P-frames rather than I-frames, B-frames rather than P-frames. Further, data corresponding to P-frames and B-frames close to the next I-frame is unlikely to affect. Also, discarding data close to the end of each frame, that is, data close to the lower end of the image is unlikely to affect human vision.

To selectively discard the encoded output, the data which causes less influence should be omitted first by evaluating the influence of the data on the reproduced image. As one example of this algorithm, the following criteria can be considered.

I-frames are most important, so will not be discarded.
B-frames should be given top priority to be discarded.

When B-frames being discarded are not sufficient enough, P-frames should be discarded.

P-frames that have long time to the next I-frame should be left preferentially.

One example of an algorithm for discarding data based on the above criteria will be described. For simplicity, shown here is a process handling an MPEG stream including I-frames and P-frames only.

Figure 9:
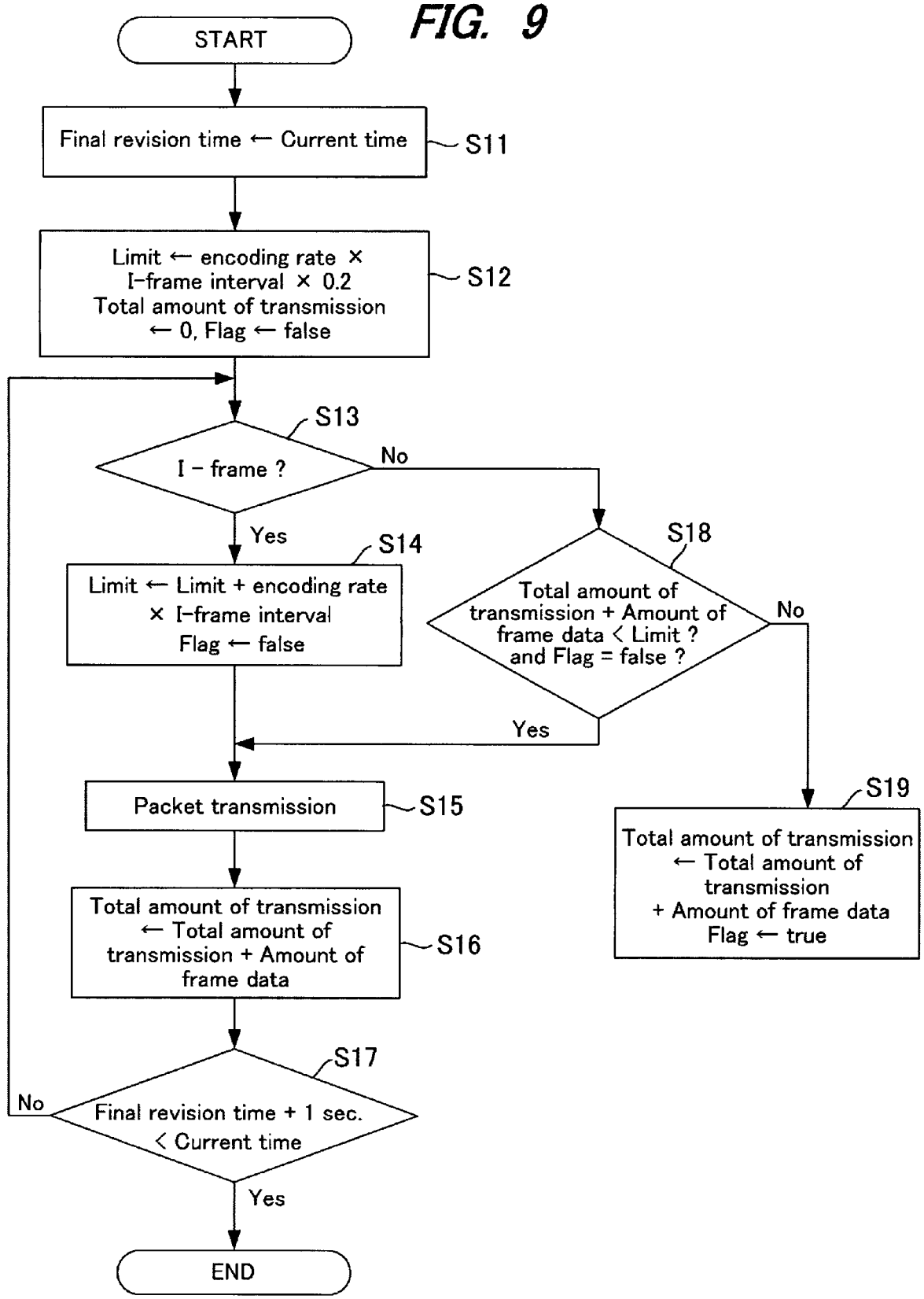
FIG. 9 is a flow chart showing the sequence of discarding the data that exceeds the encoding rate.

FIG. 9 is a flow chart showing a sequence of discarding data exceeding the encoding rate, and this sequence is started when the encoding rate is revised.

To begin with, the time at which encoder 11 changes its encoding rate is measured by time clock 13 and set with the current time (Step S11). Channel band estimator 16 sets the initial limit with (encoding rate)×(I-frame interval)×0.2, sets the total amount of transmission at 0 and sets a flag to false (Step S12). Here, the limit is a reference value and based on this it is determined that data should be discarded if data greater than the value is transmitted. The flag is one that indicates continuation of discarding P-frames once a P-frame is discarded until the next I-frame appears. Herein, the initial value of the limit is set up on the assumption that the amount of data to be transmitted from one I-frame to the next varies about 20%.

It is determined whether data is for an I-frame (Step S13), and if it is I-frame data, the limit is added with (encoding rate)×(I-frame interval) and the flag is set to false (Step S14), and packet transmission from packet transmitter 12 is carried out (Step S15). Then, (the total amount of transmission+the amount of frame data) is set as the total amount of transmission (Step S16) and the operation goes to Step S17.

If data is not for an I-frame, channel band estimator 16 determines whether (the total amount of transmission+the amount of frame data) is smaller than the limit and whether the flag is set at false (Step S18), and if it is affirmative, the operation goes to Step S15. Otherwise, (the total amount of transmission+the amount of frame data) is set to the total amount of transmission, and the flag is set to true (Step S19), and the operation goes to Step S17.

At Step S17, (the final revision time+1 sec.) is compared with the current time. When 1 second has elapsed after the final revision time, the process is ended and the operation makes ready for a next encoding rate revision. If not, the operation returns to Step S13. Here, 1 second is the time required from the revision of encoding rate till the encoder responds.

Figure 10:
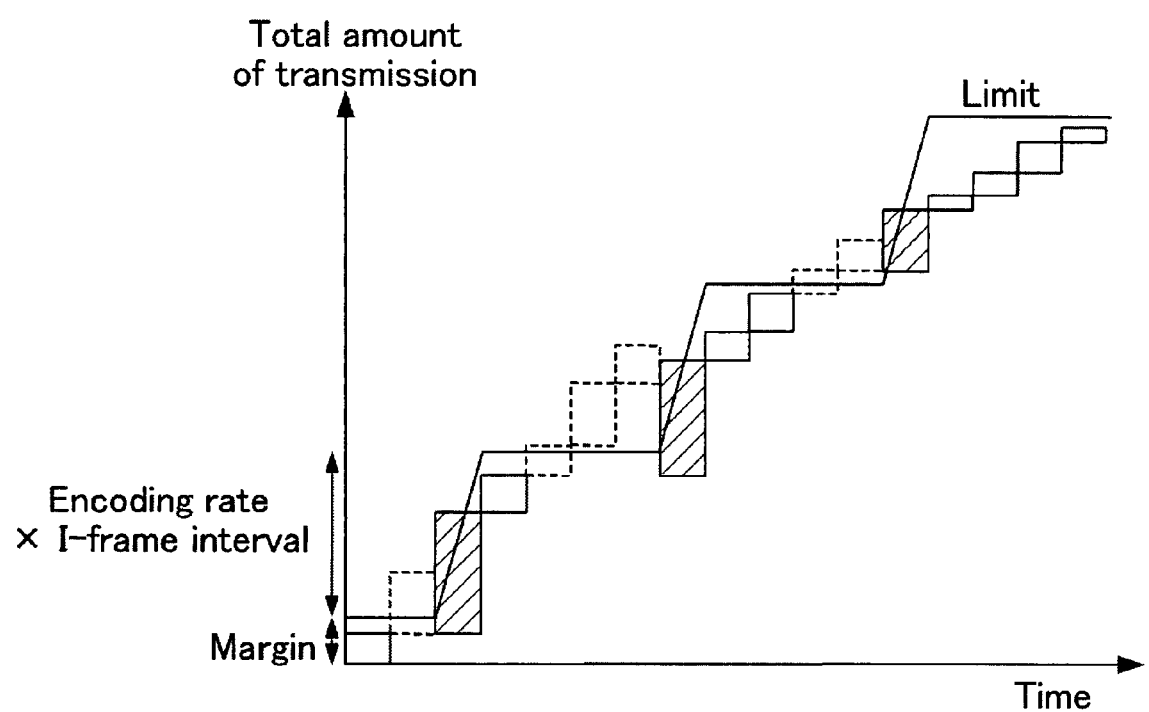
FIG. 10 is an illustrative chart showing the transmission status when the packet data exceeding the encoding rate, other than I-frames, is discarded.
Figure 11:
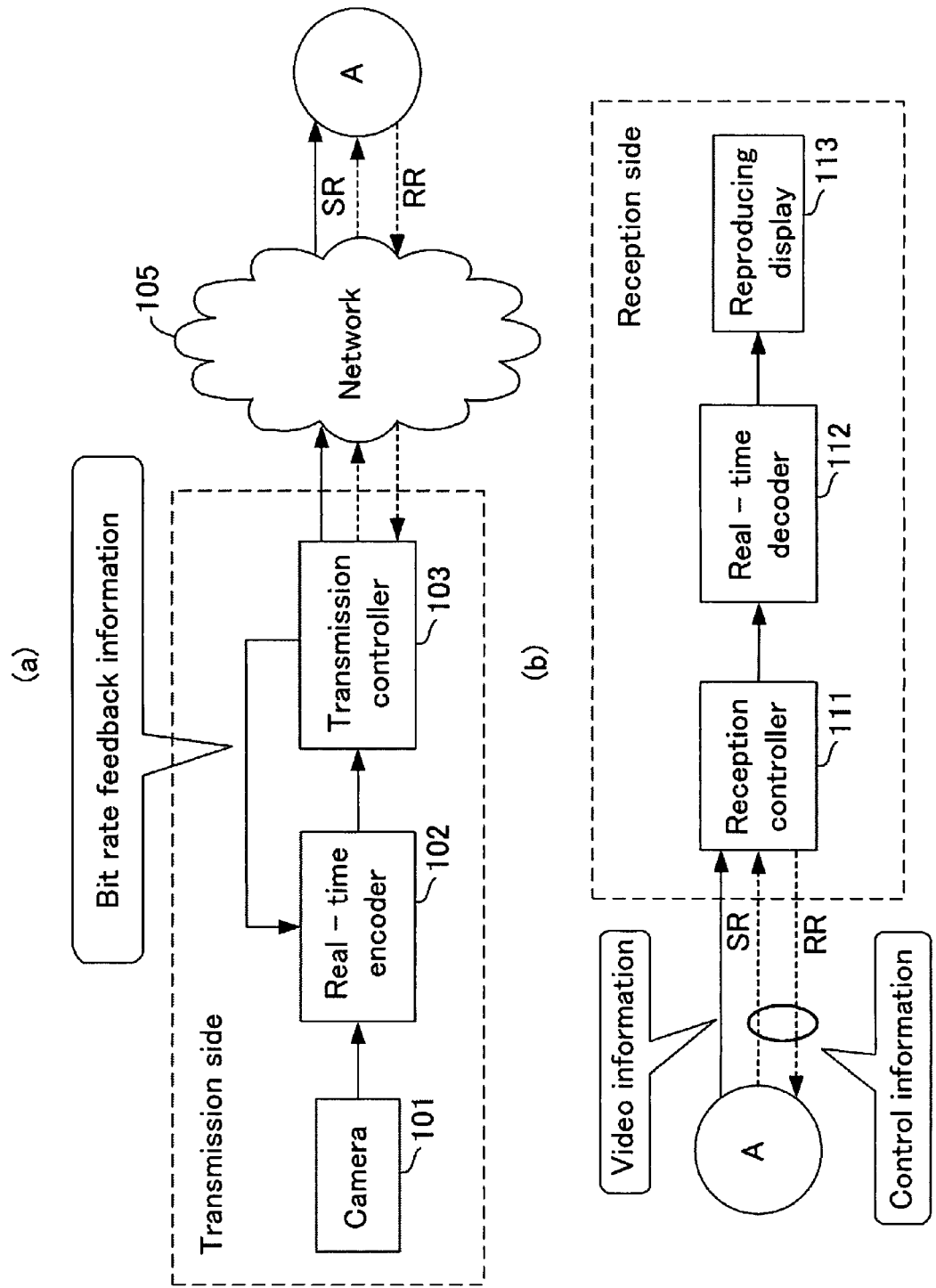
FIG. 11 is a block diagram showing a conventional communication system.
Figure 12:
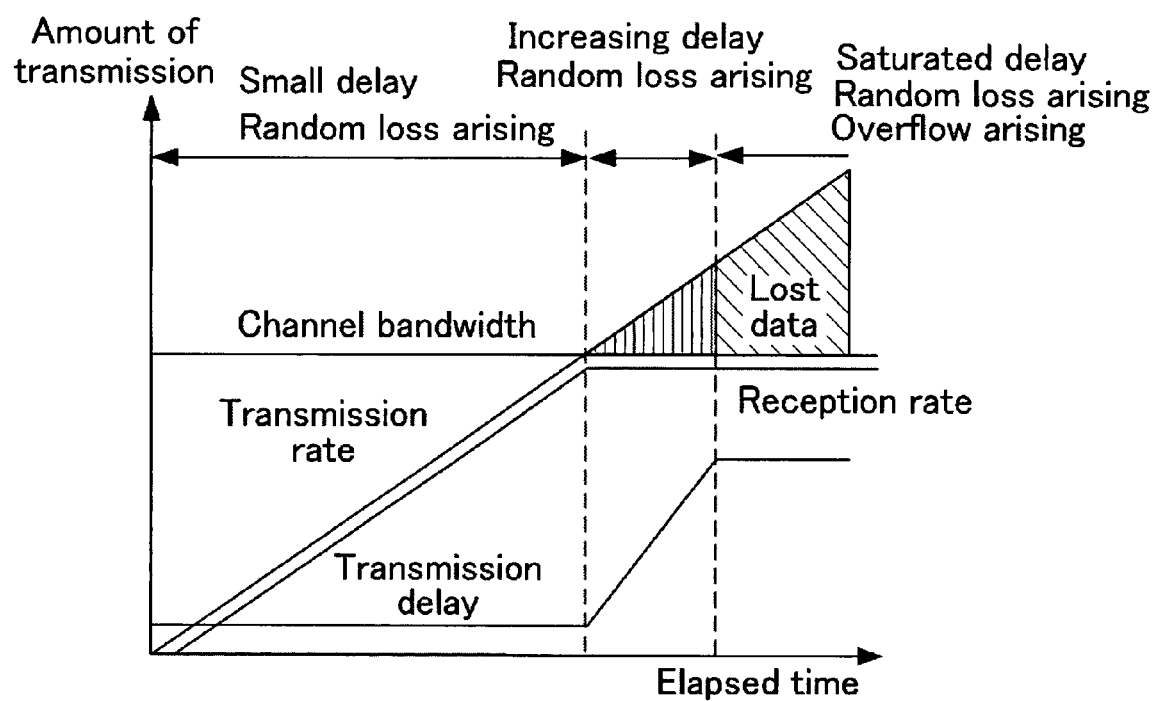
FIG. 12 is an illustrative chart showing network conditions with increase in transmission rate with respect to the channel bandwidth.

FIG. 10 is an illustrative chart showing a transmission status when the above is applied. The margin corresponds to the aforementioned (encoding rate)×(I-frame interval)×0.2. The height of each rectangle represents the amount of data of each packet. The hatched rectangles represent packets corresponding to I-frames. The packets indicated by a broken line represent those discarded. Once a packet is discarded, all the packets are unconditionally discarded until the next I-frame appears.

In this way, when the encoding rate is cut down in accordance with the network condition, it is possible to reduce the dead time by the time corresponding to the response time of the encoder. Further, even if it becomes necessary to discard data exceeding the encoding rate during the response time, packets of data other than I-frames are discarded, so it is possible to deal with such a status without degrading the visual quality of video to be reproduced.

The invention claimed is:

1. A transmitter which transmits streaming data and controls a transmission bit rate based on an outgoing transmission delay of the streaming data and a packet loss ratio of the streaming data both of which are determined by reception of the streaming data by a receiver, wherein the transmission delay used for control is a varying value on the basis of, at least, a delay at a start of communication, and wherein when the packet loss ratio has increased without increase of the transmission delay, the encoding rate is kept unchanged.

2. A transmitter which transmits streaming data and controls a transmission bit rate based on an outgoing transmission delay of the streaming data and a packet loss ratio of the streaming data both of which are determined by reception of the streaming data by a receiver, wherein the transmission delay used for control is a varying value on the basis of a minimum value of the communication delay from a start of communication, and wherein when the packet loss ratio has increased without increase of the transmission delay, the encoding rate is kept unchanged.

3. A transmitter which transmits streaming data and controls an encoding rate based on an outgoing transmission delay of the streaming data and a packet loss ratio of the streaming data both of which are determined by reception of the streaming data by a receiver, wherein the transmission delay used for control is a varying value on the basis of, at least, a delay at a start of communication, and wherein when the packet loss ratio has increased without increase of the transmission delay, the encoding rate is kept unchanged.

4. A transmitter which transmits streaming data and controls an encoding rate based on an outgoing transmission delay of the streaming data and a packet loss ratio of the streaming data both of which are determined by reception of the streaming data by a receiver, wherein the transmission delay used for control is a varying value on the basis of a minimum value of the communication delay from a start of communication, and wherein when the packet loss ratio has increased without increase of the transmission delay, the encoding rate is kept unchanged.

* * * * *